United States Patent
Eikkula

(12) 
(10) Patent No.: US 7,068,779 B1
(45) Date of Patent: Jun. 27, 2006

(54) CONTROL OF ECHO CANCELLERS IN A TELECOMMUNICATION SYSTEM

(75) Inventor: Jari Eikkula, Espoo (FI)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 10/070,324

(22) PCT Filed: Sep. 22, 2000

(86) PCT No.: PCT/FI00/00815

§ 371 (c)(1),
(2), (4) Date: Mar. 6, 2002

(87) PCT Pub. No.: WO01/22612

PCT Pub. Date: Mar. 29, 2001

(30) Foreign Application Priority Data

Sep. 24, 1999 (FI) .................................... 19992054

(51) Int. Cl.
*H04M 1/00* (2006.01)

(52) U.S. Cl. ..................... 379/406.04; 379/406.06; 379/406.02

(58) Field of Classification Search ........... 379/406.01, 379/406.02, 406.04, 406.06
See application file for complete search history.

(56) References Cited

U.S. PATENT DOCUMENTS 5,953,658 A 9/1999 Scott

FOREIGN PATENT DOCUMENTS

| EP | 920 172 | 6/1999 |
|----|---------|--------|
| JP | 07-75140 A | 3/1995 |
| JP | 9055964 | 2/1997 |
| JP | 10-257173 A | 9/1998 |

*Primary Examiner*—Jefferey F. Harold
(74) *Attorney, Agent, or Firm*—Pillsbury Winthrop Shaw Pittman LLP

(57) ABSTRACT

The invention relates to a communications network, including switching centers having no echo canceling equipment and switching centers having echo canceling equipment. The switching centers are capable of changing the call party or the call during the call. The switching center which controls the change of call party or call type is arranged to command the nearest switching center having the echo canceling capability to connect/disconnect an echo canceling equipment to/from the connection. In other words, in these special situations the echo cancellation is controlled by a new signaling feature within the communications network.

17 Claims, 2 Drawing Sheets

CONTROL OF ECHO CANCELLERS IN A TELECOMMUNICATION SYSTEM

This is a National Stage application of International Application No. PCT/FI00/00815, which was filed on Sep. 22, 2000, which designated the U.S., and was filed in the English language.

FIELD OF THE INVENTION

The invention relates to echo canceling, and more particularly, to control of echo cancellers in telecommunication systems.

BACKGROUND OF THE INVENTION

In telecommunications networks transferring speech, such as telephone networks and mobile communications systems, an echo may occur on end-to-end connections, as the voice of the talking party is reflected from the network elements or the connection. The echo is disturbing if there is a significant delay on the end-to-end connection. The delay is usually a propagation delay which causes the echo especially in long-distance or international calls and in calls using satellite links. The delay may also result from digital signal processing which is the main reason for echo in digital mobile communications systems. The echo is divided into two categories: an acoustic echo between the ear piece and the microphone over telephone and an electric echo caused in transmission and reception directions in communications systems. One of the main reasons behind the electric echo is hybrid circuits (two-wire-four-wire converters) located in local exchanges or remote subscribers' stages.

An echo canceller or an echo suppresser has conventionally been used to obviate problems caused by the echo. An echo canceller is a device for processing a speech signal. It estimates the echo and reduces it by subtracting the echo estimate from a signal returning from the echo path.

In mobile communications systems, the echo cancellers are typically included in the mobile terminals and mobile switching centers which provide a gateway to other network, such as the public switched telephone network PSTN. The mobile switching center providing a gateway to the PSTN is referred to as a PSTN gateway-MSC herein. In the MS-MS call both the terminals contain the needed echo canceller device and the network elements involved in the call need not have any echo canceller. In the PSTN-MS call another echo canceller must be connected to the PSTN side of the call at the PSTN gateway-MSC while the other echo canceller is in the MS, or otherwise the echo is noticed in the mobile terminal.

An intelligent network is a flexible way to introduce new services into the telecommunications network. The intelligent network consists of service control points (SCP), service switching points (SSP) and various other elements. The service switching point's (SSP) functionality is typically located in the switching center of a conventional communications network, such as the MSC or the GMSC in the GSM system. The SSP/MSC is then connected to the service control point (SCP) which contains the intelligent service programs. The call control of the MSC uses a basic call state model (BCSM) which contains various detection points (DP) for modeling the state of the call towards the SCP. One or more of the detection points may be provided with a service trigger for the desired IN service. When call establishment proceeds to the detection point in the BCSM, and there is an activated service trigger, the SSP/MSC sends a request to the SCP. The SCP responds with operations which control the functions of the SSP/MSC in such a way that the activated service can be provided.

The IN services or similar services (e.g. services initiated by a voice message service or a voice mail system VMS) may include call drop back, call drop back return, follow on call, and call party handling services. The call drop back mechanism allows subscriber A to make a call to the person who has left a message in the voice mail. The call will be "dropped" to some of the previous MSCs and rerouted to subscriber C. In this mechanism subscriber A does not have to release the original call and make a new call to subscriber C. Call drop back return is a re-establishment of the MSC-VMS/service node (VMS=Voice Mail Service) connection, when the connection to the subscriber C has been successful and when the subscriber C has hung up the phone. The call can then be forwarded again to another subscriber. The follow-on call is a feature that enables the user to make a series of service requests without going through the identification and authentication process before performing each requested service. The identification and authentication are performed only on the first service request of the series. This functionality may be enhanced with other capabilities, it may be used e.g. for the call drop back service. One further service is call party handling (CPH). The CPH operations allow to establish new call parties in a flexible manner or to remove parties from the call and control the cross-connections between the parties. All the above-mentioned services may involve change of the connection configuration during the call.

The echo problem can appear in some particular cases when the connection configuration is changed during the call. This problem arises if the original connection configuration does not reserve any echo canceller, but the new connection configuration would require one. This happens, for example, when a PSTN-PSTN connection is changed to a PSTN-MS connection. The same problem also concerns private branch exchange (PBX) calls. As an example, let us assume that a call addressed to a mobile station MS is routed from the PSTN via a PSTN gateway mobile switching center (PSTN gw-MSC) to a serving mobile switching center (MSC) within a mobile network. Then, due to an activated call-forwarding-when-busy service, for example, the call is further routed from the serving MSC via the same or another PSTN gw-MSC to the PSTN. In a PSTN-PSTN call no echo canceller is reserved in the PSTN gw-MSC. Then, later during the call, when for instance the CPH is used, the connection configuration is changed by releasing the second (forward) PSTN leg and establishing a new connection leg to the called MS under control of the serving MSC. The new PSTN-MS call would require an echo canceller but the PSTN gw-MSC has not reserved any echo canceller for the call. Therefore, the MS subscriber will experience a disturbing echo. One solution to this problem would be to provide an echo canceller in each MSC so that the serving MSC can internally connect an echo canceller to a call connection while changing the connection configuration.

Similar problem may arise when the type of call is changed during an active call. For example, a call may be started in a speech mode requiring an echo canceller in the PSTN gw-MSC and then later be changed into a facsimile mode in which the echo canceller is not allowed. Thus, also switching between the speech mode and the fax mode during a call requires an echo canceller in each MSC so that the echo canceller can be connected to and disconnected from the call.

DISCLOSURE OF THE INVENTION

An object of the present invention is to avoid the need for echo canceling equipment in each switching center in a communications network.

The invention relates to methods and communication networks as claimed in the attached independent claims. Preferred embodiments of the claims are disclosed in the dependent claims.

The basic idea of the invention is that the switching center which controls the change of the call party or the change of the call type is arranged to command the nearest switching center having the echo canceling capability, to connect/disconnect echo canceling equipment to/from the connection. In other words, in these special situations the echo cancellation is controlled by a new signaling feature within the communications network. As a result, it is unnecessary to introduce echo canceling equipment into each switching center in the communications network for these special situations only.

The signaling may be performed by any signaling message which can be sent during an active call, e.g. a new signaling message defined for this special purpose, or an existing signaling message modified to carry the echo canceller control information according to the invention. In the preferred embodiment of the invention, an ISUP message, such as the ISUP Facility message, is provided with a new parameter for controlling the echo canceling.

BRIEF DESCRIPTION OF THE DRAWINGS

In the following the invention will be described in great detail by means of the preferred embodiments with reference to the accompanying drawings, in which.

PREFERRED EMBODIMENTS OF THE INVENTION

The present invention can be applied to any telecommunications system in which the connection configuration or the call type or any other feature of the call is changed during the call so that the need for echo canceling arises or echo canceling cannot be used any more.

The preferred embodiments of the invention will be described below using the GSM mobile communication network as an example.

Figure 1:
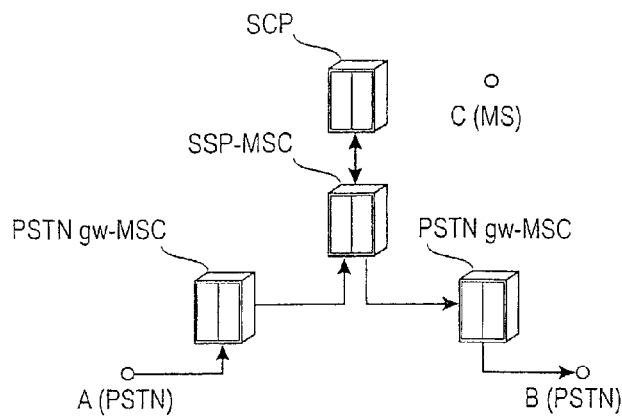
FIG. 1 is a block diagram illustrating a PSTN-PSTN call established via a serving SSP/MSC in a mobile communications network.

Referring now to FIG. 1, the mobile switching center MSC is connected to a service control point of the intelligent network and operates as a service switching point SSP. Although not shown in FIG. 1, the MSC/SSP is connected to a base station system BSS which provides a radio connection for the mobile station MS. One or more of the mobile switching centers in the mobile network are gateway MSCs which comprise gateway functions for calls routed to external telecommunications networks and calls arriving from those networks. In FIG. 1 there are two PSTN gw-MSCs connected to the PSTN. There are also at least two data bases, the home location register HLR and the visitor location register VLR in the network (not shown).

FIG. 1 shows a PSTN-PSTN call connection configuration. This connection configuration may have resulted for example from a call made by the PSTN subscriber A via the PSTN gw-MSC to the SSP/MSC serving the addressed mobile station MSC (subscriber C). Then, for some reason, for example due to a call-forwarding-when-busy function, the second connection leg is not established from the SSP/MSC to the called MS but the call is routed via a second PSTN gw-MSC to a second PSTN subscriber (subscriber B). As a consequence, we have a connection comprising a first connection leg from the subscriber A to the serving SSP/MSC and a second connection leg from the serving SSP/MSC to the PSTN subscriber B.

Figure 2:
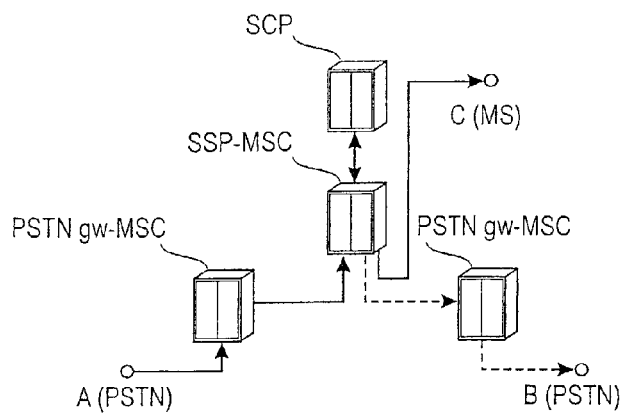
FIG. 2 is a block diagram illustrating a PSTN-MS call changed from the PSTN-MS call of FIG. 1 by means of call party handling CPH, for example.
Figure 3:
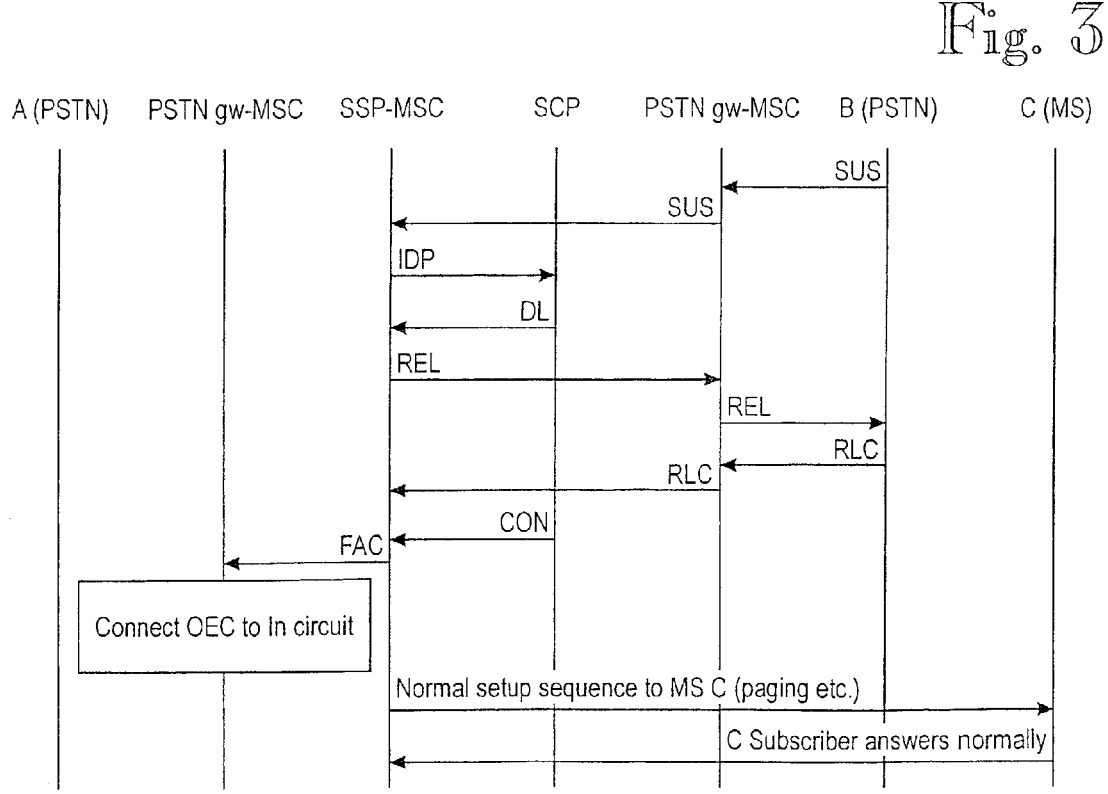
FIG. 3 is a signaling diagram illustrating the signaling used for changing the connection configuration from FIG. 1 to FIG. 2 and the control of the echo canceller according to the present invention.

Let us now assume that when the call is active and having a configuration as illustrated in FIG. 2, the PSTN subscriber B who has a re-answer possibility initiates release of the call, and an ISUP release message SUS is sent via the PSTN gw-MSC to the SSP/MSC. Based on the follow-on call feature, for instance, the SSP/MSC sends an initial DP message (an INAP operation) in order to initiate a new IN service in the SCP. The SCP responds with a disconnect leg message DL. Disconnect leg is an INAP operation which enables the SCP to disconnect (release) a connection leg in a two-party or multiparty call. Upon receiving the message DL, the SSP/MSC sends an ISUP release-message REL via the PSTN gw-MSC to the PSTN. The terminating side will acknowledge the REL by a message RLC. As a result, the second leg from the SSP/MSC to the PSTN is released. It should be noted that the IN service initiated by the IDP message involves some sort of user interaction before the DL message is sent. For example, an announcement may be played to the subscriber A in order to prompt him to provide instructions on how the call should be rerouted. The instructions may be given orally or by DTMF (Dual Tone Multi Frequency) dialing. The announcement may be for example: "Push number one for the secretary, number two for the voice mail", etc. It is also possible that the subscriber B, e.g. a voice message service, sends the number of the subscriber C to which the call should be rerouted in the release message REL. In the latter case the MSC can independently reroute the call also when no IN network is involved (cf. The call dropback service).

After sending the message DL, the SCP sends a connect message CON to the SSP/MSC. Connect is an INAP operation which enables the SCP to provide a telephone number of the new subscriber C to which the call is to be rerouted. The telephone number of the subscriber C may have been obtained from the subscriber A during the user interaction or selected according to the instructions from the subscriber A, or the number may have been obtained by some other method.

Upon receiving the message CON, the SSP/MSC sends an ISUP facility message FAC to the PSTN gw-MSC on the first leg (i.e. towards the subscriber A). In accordance with the present invention, the message FAC contains control information which causes the PSTN gw-MSC to connect the echo canceling equipment to a line. The SSP/MSC has determined that echo canceling is needed because the new subscriber C is a mobile station MS.

Prior to, simultaneously with, or after sending the message FAC, the SSP/MSC carries out a normal call setup to the mobile station C. As the call to be setup is a speech call, echo canceling is automatically used in the mobile station MS. Then the subscriber C answers normally and call configuration is completed as shown in FIG. 2. The old call configuration is shown by a dashed line in FIG. 2.

The ISUP facility message is defined in ITUT-recommendation Q.763, table 45. The new echo-canceller-control parameter for the purposes of the present invention can be defined to be one of the optional parameters. Other parameters which may be required in the echo canceller control are the message type, message compatibility information, and parameter compatibility information in the facility message. It should be noted, however, that the control information according to the present invention can be sent using any message which can be sent in a speech state during an active call.

Another reason for using call configuration according to FIG. 1 may be that the subscriber A has called to a service number in a mobile communications network, and the call has resulted in a IN service request to the SCP in a signaling phase, and then the SCP has commanded that the call should be routed to the PSTN subscriber B. In this case, the SSP would likely report the release of the second leg using an event report BCSM (ERB) message instead of an IDP message.

Figure 4:
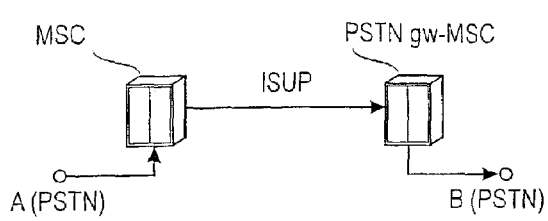
FIG. 4 is a block diagram illustrating a speech/fax call between the MS and the PSTN.

As noted above, the need for echo canceling may change also when the call type is changed during an active call. The possible call types may include a speech mode, a facsimile mode, and a data transmission mode, for example. In the following, the invention will be illustrated by using a speech/fax call as an example. FIG. 4 illustrates a speech/fax call established from a mobile subscriber A via a serving MSC and a PSTN gw-MSC to the PSTN subscriber B. The PSTN gw-MSC is provided with echo canceling equipment which can be connected to the call when needed. The MSC has no echo canceling equipment. Normally, when establishing a speech call, the GSM traffic channel between the mobile station MS and the serving MSC is in a speech mode using speech encoding. The transmission leg between the serving MSC and the PSTN gateway MSC is typically a PCM link, and a typical PSTN connection (or ISDN connection) is provided between the PSTN gw-MSC and the PSTN subscriber B. As the call is established in a speech state, the echo canceling equipment is also needed and connected to the line in the PSTN gateway-MSC. However, upon establishing the call initially in a speech mode, the mobile station may automatically or due to the user intervention, change the call type into a facsimile mode. The facsimile mode means that the traffic channel between the MS and MSC is in a data mode and specific facsimile adapters are provided at the ends of the connection. The echo canceling is not allowed in the facsimile call since the signal is distorted by the echo canceling, and thus the facsimile transmission has deteriorated or failed. Therefore, the echo canceling equipment should be disconnected from the line in the PSTN gw-MSC. On the other hand, if the call were later returned to the speech mode, the echo canceling equipment should be connected back to the line.

Figure 5:
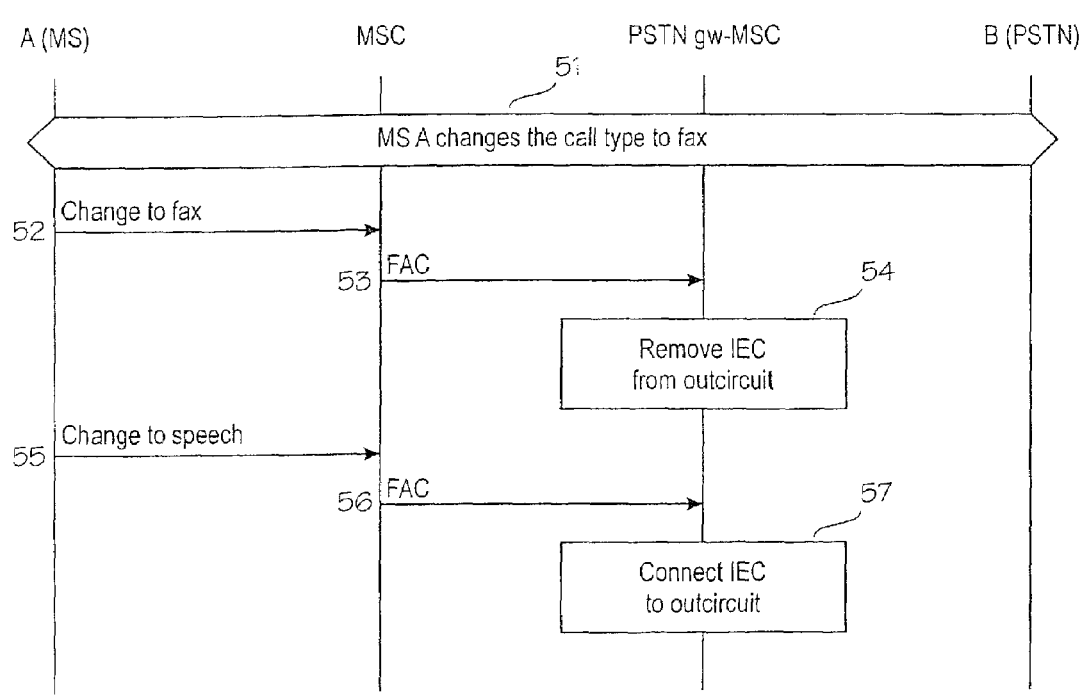
FIG. 5 is a signaling diagram illustrating the change of the call type from speech to fax and vice versa, and the associated control of the echo canceller according to the present invention.

FIG. 5 is a signaling diagram illustrating the echo canceller control according to the present invention in a speech/facsimile call. Firstly, the MS changes the call type from the speech to the facsimile mode in the mobile equipment (step 51). The MS initiates the change of the GSM traffic channel from the speech mode to the facsimile mode by signaling to the MSC (step 52). The MSC changes the mode of the traffic channel, and in accordance with the present invention, sends an ISUP facility message FAC containing the echo canceller control information to the PSTN gateway-MSC (step 53). Reacting to the received control information, the PSTN gw-MSC disconnects the echo canceller from the outbound circuit of the connection (step 54). As a result, successful facsimile transmission can be initiated.

Later in the call the mobile station MS initiates a change back to the speech mode (step 55). The MSC changes the GSM traffic channel from the facsimile mode into the speech mode and, in accordance with the present invention, sends an ISUP facility message FAC containing the echo canceller control information to the PSTN gw-MSC. Reacting to the echo canceller control information, the PSTN gw-MSC connects the echo canceling equipment back to the outbound circuit of the connection (step 57).

It is also possible to disconnect the echo canceller from the line when facsimile signaling is detected by the echo canceller or the PSTN gw-MSC. However, in this case the echo canceller cannot be connected back to the line when the call is changed back to the speech mode, and thus an echo will be present in the call in the prior art systems. Also, this problem can be avoided by an embodiment of the present invention wherein the serving MSC, when changing the mode of GSM traffic channel, commands the PSTN gw-MSC to connect the echo canceller to the line. This corresponds to steps 55–57 in FIG. 5. However, when changing from a speech mode to a facsimile mode, the echo canceller independently detects the facsimile mode and leaves the connection. In other words, the steps 52–53 of FIG. 5 are not needed in this embodiment.

The application has been described above by means of the preferred embodiments to illustrate the principles of the invention. The details of the invention may vary within the scope and spirit of the accompanying claims.

What is claimed is:

1. A method for controlling echo canceling in a telecommunications network comprising a first switching center having no echo canceling equipment and at least one second switching center having echo canceling equipment, said method comprising
    establishing a call connection in a speech mode via said first switching center and said at least one second switching center so that the echo canceling equipment is connected to the connection,
    changing, under control of said first switching center, the type of call connection from the speech mode to another transmission mode in which echo canceling is not allowed,
    sending to said at least one second switching center from said first switching center a signaling message commanding said second switching center to disconnect the echo canceling equipment from the connection,
    changing, under control of said first switching center, the type of the call connection from said other transmission mode back to the speech mode, and
    sending to said at least one second switching center from said first switching center a signaling message commanding said second switching center to connect the echo canceling equipment to the connection.

2. A method according to claim 1 wherein said other transmission mode is a facsimile mode or a data transmission mode.

3. A method for controlling echo canceling in a telecommunications network comprising a first switching center having no echo canceling equipment and at least one second switching center having echo canceling equipment, said method comprising
  establishing a call connection in a speech mode via said first switching center and said at least one second switching center so that the echo canceling equipment is connected to the connection,
  changing under control of said first switching center, the type of call connection from the speech mode to another transmission mode in which echo canceling is not allowed, and
  sending to said at least one second switching center from said first switching center a signaling message commanding said second switching center to disconnect the echo canceling equipment from the connection,
  wherein said telecommunications network is a mobile communications network, said first switching center is a mobile switching center, and said at least one second switching center is a gateway mobile switching center connecting said mobile communications network to a fixed telephone network.

4. A method according to claim 3, comprising
  establishing said call connection between a mobile station and a second fixed network subscriber through said first mobile switching center and said gateway mobile switching center with echo canceling equipment being connected to the call connection in said gateway mobile switching center,
  changing, under control of said mobile switching center, the type of call connection from the speech mode to said other transmission mode in which echo canceling is not allowed,
  sending to said gateway mobile switching center from said first mobile switching center said signaling message commanding said gateway mobile switching center to disconnect the echo canceling equipment from the connection.

5. A method according to claim 3, comprising
  changing, under control of said mobile switching center, the type of the connection from said other transmission mode back to the speech mode,
  sending to said gateway mobile switching center from said first mobile switching center said signaling message commanding said gateway mobile switching center to connect the echo canceling equipment to the connection.

6. A communications network, comprising a first switching center having no echo canceling equipment and at least one second switching center having echo canceling equipment, said first switching center being configured to be capable of changing the call party during the call by releasing a connection leg to an old party and establishing a new connection leg to a new party, and wherein
  the first switching center is configured to send, in response to the change of call party, to said at least one second switching center a signaling message commanding said second switching center to connect the echo canceling equipment to a call connection, when there is no echo canceling equipment already connected to the call connection and echo canceling is required due to the new party.

7. A network according to claim 6, wherein said communications network is a mobile communications network, said first switching center is a mobile switching center, and said at least one second switching center is a gateway mobile switching center connecting said mobile communications network to a fixed telephone network.

8. A network according to claim 7, wherein said call connection initially comprises a first connection leg from the first mobile switching center via said gateway mobile switching center to a first fixed telephone network party, and a second connection leg from the first mobile switching center to a second fixed telephone network party, and wherein the first mobile switching center is configured to release the second connection leg in response to a release message sent by the second fixed telephone network party, and to establish a new connection leg from the first mobile switching center to a mobile subscriber, said new connection requiring echo canceling.

9. A network according to claim 7, wherein said call connection initially comprises a first connection leg from the first mobile switching center via said gateway mobile switching center to a first fixed telephone network party, and a second call connection leg from the first mobile switching center via said gateway mobile switching center to a service node, preferably a voice mail service, and that the first mobile switching center is configured to release the second connection leg in response to a release message sent by the service node, and to establish a new connection leg from the first mobile switching center to a mobile subscriber, said new connection requiring echo canceling.

10. A network according to claim 6 wherein said message is an ISUP Facility message provided with control information for controlling the connecting of the echo canceling equipment.

11. A network according to claim 6, wherein said first switching center is connected to a service control point in an intelligent network.

12. A network according to claim 11, wherein said first switching center is configured to perform the change of a call party by a call party handling procedure of the intelligent network.

13. A communications network comprising a first switching center having no echo canceling equipment and at least one second switching center having echo canceling equipment, said first switching center being configured to be capable of changing the call type from a speech mode to another transmission mode during the call, and wherein
  the first switching center is configured to send, in response to said change of call type from said speech mode to said other transmission mode, to said at least one second switching center a signaling message commanding said second switching center to disconnect the echo canceling equipment from a call connection, when said call connection is routed via said second switching center.

14. A network according to claim 13, wherein said telecommunications network is a mobile communications network, said first switching center is a mobile switching center and said at least one second switching center is a gateway mobile switching center connecting said mobile communications network to a fixed telephone network.

15. A network according to claim 13 or 14, wherein said other transmission mode is a facsimile mode or a data transmission mode.

16. A switching center for a communications network, wherein
  the switching center echo canceling equipment is capable of changing the call party during the call by releasing a connection leg to an old party and establishing a new connection leg to a new party, and
  the first switching center is configured to send, in response to the change of call party, to a second switching center having echo canceling equipment a signaling message commanding said second switching center to connect the echo canceling equipment to a call connection, when there is no echo canceling equipment already connected to the call connection and echo canceling is required due to the new party.

17. A switching center for a communications network, wherein the switching center without echo canceling equipment is capable of changing the call type from a speech mode to another transmission mode during the call, and the switching center is configured to send, in response to said change of call type from said speech mode to said other transmission mode, to a second switching center having echo canceling equipment, a signaling message commanding said second switching center to disconnect the echo canceling equipment from a call connection, when said call connection is routed via said second switching center.

* * * * *